Patented Nov. 19, 1929

1,736,448

UNITED STATES PATENT OFFICE

OTTO LIEBKNECHT, OF BERLIN-GRUNEWALD, GERMANY

COMPOSITION OF MATTER AND PROCESS FOR DESTROYING NOXIOUS CREATURES

No Drawing. Application filed January 8, 1927, Serial No. 159,998, and in Germany January 19, 1925.

The present invention has the purpose for the destruction of injurious creatures, especially for freeing seeds from injurious creatures, parasites or microbes.

The composition of matter according to the invention contains volatile chromium compounds. Suitable chromium compounds are chromylhaloides, as for instance chromylchloride, chromylfluoride, chromylacetylacetonate. These compounds may be used alone or in admixture with other compounds having no chemical action on the chromium compounds, having action on the creatures or being inert. These admixed substances may be volatile or nonvolatile, organic or inorganic, solid, liquid, gaseous. They may have a dissolving action on the chromium compounds. A suitable substance is carbontetrachloride, or another carbonhaloide. Suitable gases are hydrocyanic acid, carbon monoxide.

The volatile chromium compounds have the advantage of stimulating the germinative faculty of the seeds and to free the seeds from the injurious creatures without wetting the seed with water.

The necessary quantities of the chromium compounds depend on the species of the creatures (quadrupedes, insects, fungi, spores) the rooms in which they are, the matter which shall be deprived from the noxious creatures.

The process to destroy the creatures or to protect seeds consists in volatilizing or vaporizing the chromium compounds and lead them to the matter to be treated. If the chromium compound is a gas, the latter is conducted to the room in which the matter to be treated is stored.

If ants are to be destroyed or killed in passages it is necessary to fill the said passages completely.

Generally it is sufficient to vaporize 50–200 cubic centimetres of a 50 percent solution of chromylchloride in carbontetrachloride in order to have an action in a room of 1 quadratmeter.

Suitable compositions are for instance:

1. 10 parts by weight of chromylchloride (chromylfluoride, chromylacetylacetonate) 10 parts by weight carbontetrachloride.

2. 10 parts by weight of chromylchloride (chromylfluoride, chromylacetylacetonate) 20 parts by weight kieselguhr. The mixture is heated when used or may be atomized, wherein a gasification of the chromium compound is effected if the mixture is exposed to the atmosphere.

3. 10 parts by weight of chromylchloride, 5 parts by weight of chlorinated naphthalene. The mixture is heated when used.

4. Gaseous mixtures of 10 parts by weight of chromylchloride, (chromylfluoride) (chromylacetylacetonate) 10 parts by weight of carbonmonoxide are conducted to the matter to be treated.

A modification of the process consists in that one conducts firstly the chromium compound to the room or the material to be treated and afterwards another volatile compound or gas having also an antiparasitic or destructing action on the injurious creatures.

For instance I vaporize chromylchloride (or another volatile chromium compound, as for instance chromylfluoride, chromylacetylacetonate) and lead it to the matter to be treated.

Then I lead hydrocyanic acid or vaporized trioxymethylene formaldehyde to the matter to be treated. Finally I can lead an indifferent gas to the matter in order to expel if necessary the previously introduced gases or vapours. I may use also in the above referred modifications admixtures of the chromium compound with volatile or nonvolatile, organic or inorganic, solid, liquid or gaseous admixtures, with or without dissolving action on the chromium compound, as for instance kieselguhr, carbon haloides, as carbontetrachloride.

I claim:—

1. A method of fumigating which consists in treating the objects to be fumigated with the vapors of chromium compounds volatile at room temperature.

2. A method of fumigating which consists in treating the objects to be fumigated with the vapors of chromium compounds liquid at room temperature.

3. A method of fumigating which consists in treating the objects to be fumigated with the vapors of the liquid chromyl compounds.

4. A method of fumigating which consists in treating the objects to be fumigated with the vapors of chromylhalogenides.

5. A method of fumigating which consists in treating the objects to be fumigated with the vapors of chromylchloride.

6. A method of fumigating which consists in treating the objects to be fumigated with the vapors produced by heating a solution of chromylhalogenides in organic solvents in which said chromylhalogenides are soluble.

7. A method of fumigating which consists in treating the objects to be fumigated with the vapors produced by heating a solution of chromylhalogenides in carbon chlorides.

8. A method of fumigating which consists in treating the objects to be fumigated with the vapors produced by heating a solution of chromylhalogenides in carbontetrachloride.

9. A method of fumigating which consists in treating the objects to be fumigated with the vapors produced by heating a solution of chromylchloride in carbontetrachloride.

In testimony whereof I hereunto affix my signature.

OTTO LIEBKNECHT.